United States Patent [19]
Yamaguchi

[11] Patent Number: 5,943,119
[45] Date of Patent: Aug. 24, 1999

[54] PHOTOGRAPHIC DEVELOPING/PRINTING APPARATUS

[75] Inventor: Hideki Yamaguchi, Sagamihara, Japan

[73] Assignee: Copal Company Limited, Tokyo, Japan

[21] Appl. No.: 08/957,557

[22] Filed: Oct. 24, 1997

[30] Foreign Application Priority Data

Oct. 28, 1996 [JP] Japan .................................. 8-285127

[51] Int. Cl.⁶ ............................ G03B 27/32; G03B 29/00
[52] U.S. Cl. ............................................... 355/28; 355/27
[58] Field of Search ................................ 355/28, 27, 29, 355/40, 41, 47; 354/319

[56] References Cited

U.S. PATENT DOCUMENTS

| | | | |
|---|---|---|---|
| 5,296,906 | 3/1994 | Hano et al. | 355/311 |
| 5,307,114 | 4/1994 | Nitsch et al. | 355/29 |
| 5,374,972 | 12/1994 | Nakane et al. | 354/319 |
| 5,432,586 | 7/1995 | Tokuda | 355/41 |

*Primary Examiner*—Safet Metjahic
*Assistant Examiner*—Hung Henry Nguyen
*Attorney, Agent, or Firm*—Merchant & Gould P.C.

[57] ABSTRACT

A photographic developing/printing apparatus has analog and digital exposure units arranged midway along the convey path for printing paper to obtain a silver halide photographs upon analog exposure and digital exposure. The apparatus includes a first paper magazine containing first printing paper, a first cutter for cutting the first printing paper in a predetermined size, the analog exposure unit for conveying the cut first printing paper to the exposure position and performing analog exposure, the digital exposure unit for sequentially conveying the first printing paper into a plurality of process baths containing different process solutions after analog exposure, and performing digital exposure onto second printing paper fed from a second paper magazine containing a continuous roll of second printing paper, a switching unit for selectively conveying an end portion of the uncut second printing paper to the analog and digital exposure units by switching between a first conveyance state in which the end portion of the second printing paper is conveyed to the analog exposure unit and a second conveyance state in which the end portion is conveyed to the digital exposure unit, and a second cutter for cutting the paper in a predetermined size after digital exposure. After the second printing paper is cut by the second cutter, the cut paper is conveyed to the main body portion to perform exposure/developing processing.

15 Claims, 11 Drawing Sheets

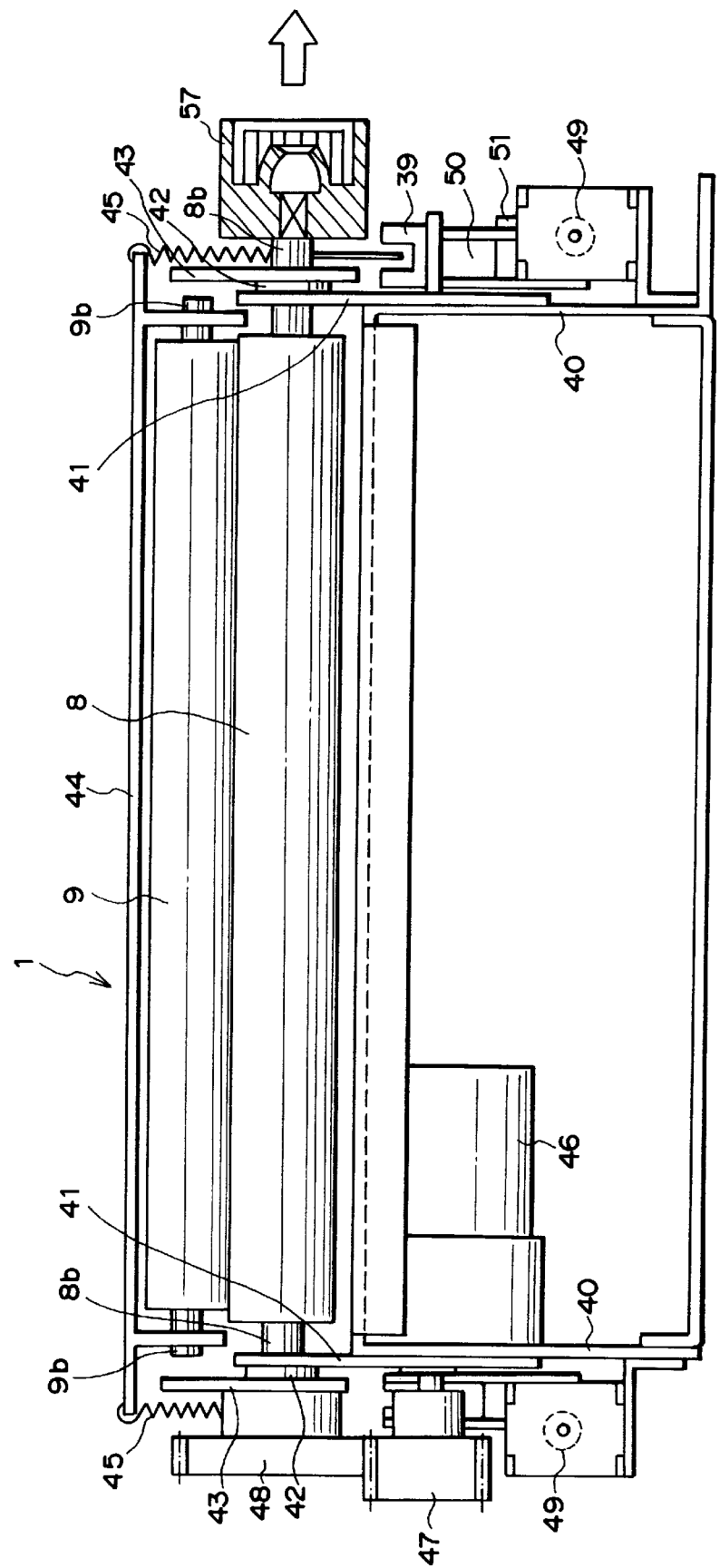

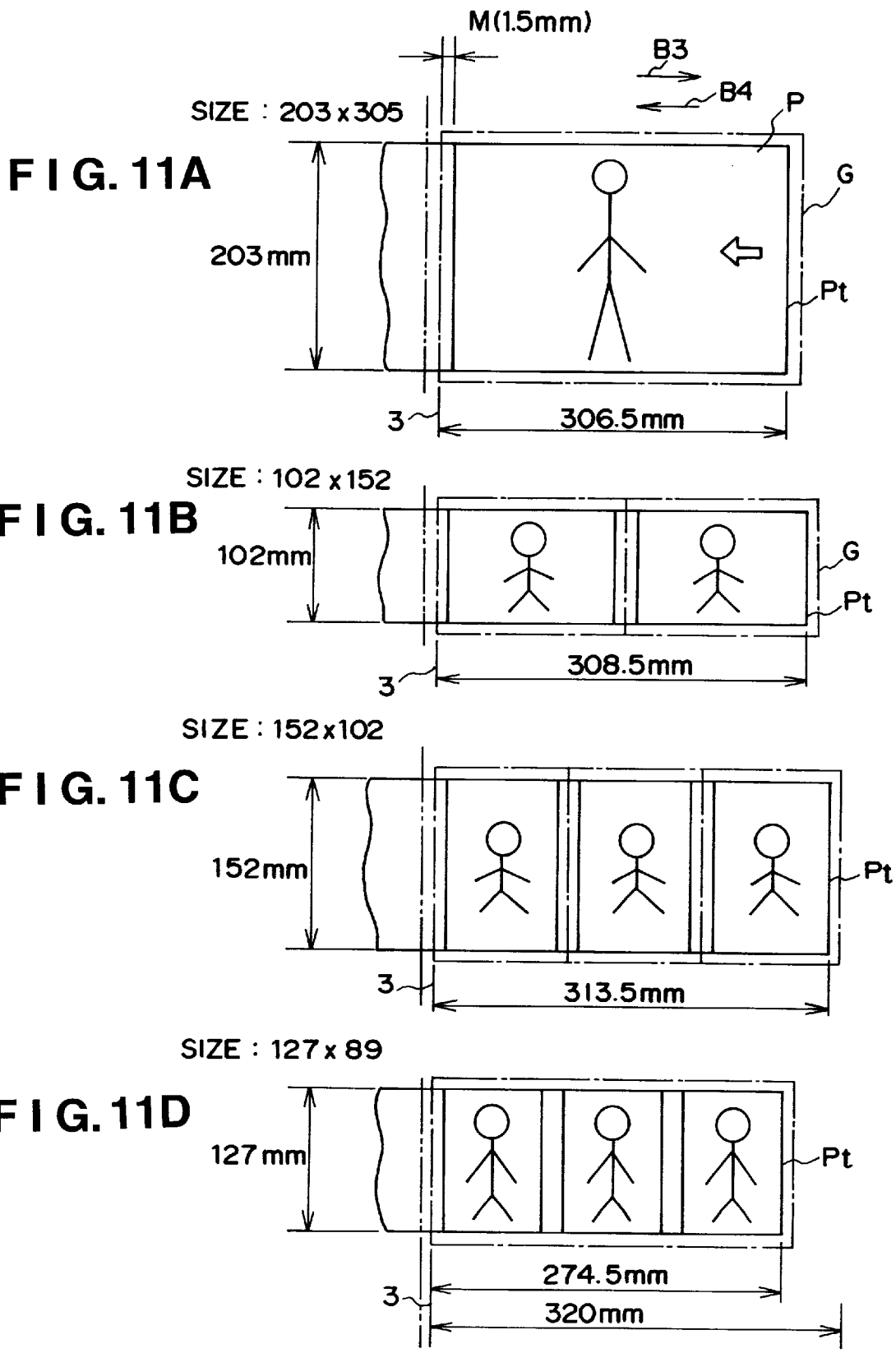

PHOTOGRAPHIC DEVELOPING/PRINTING APPARATUS

BACKGROUND OF THE INVENTION

The present invention relates to a photographic developing/printing apparatus and, more particularly, to a photographic developing/printing apparatus which can print on printing paper (to be referred to as paper hereinafter) by exposure in accordance with a digital print signal, and can also develop/print a digital image and an analog image from a conventional negative or positive film at once.

Various photographic developing/printing apparatuses have been put into practical use. These apparatuses are designed to exposure-print an original film image on paper, convey the paper to cause it to sequentially pass through process baths containing process solutions such as a developing solution, and discharge it outside after it is dried.

For example, according to the photographic developing/printing apparatus disclosed in U.S. Pat. No. 5,307,114, a continuous roll of paper stored in a paper magazine and shielded from light is cut in a desired cut size by a cutter unit in advance, and the cut paper is conveyed to an analog exposure printing unit including a film scanner, with the photographic emulsion surface facing up. An image on the film set on the film scanner is enlarged to a desired size, and analog exposure printing is performed. The resultant paper is further conveyed downstream to sequentially pass through process baths containing process solutions for developing, bleaching, and washing. The paper is discharged outside after it is dried. This apparatus further includes a rotating function. With this function, when a landscape frame is to be changed into a portrait frame in performing analog exposure in a desired size in the above manner, exposure printing can be performed on the paper in the exposure printing unit after the paper is rotated through 90°. In this manner, the apparatus makes the most of the function of cutting a continuous roll of paper in a desired size in advance.

In addition to the above function, an apparatus having a function of improving the ability of conveying paper to the respective process baths on the downstream side after the paper is cut from a continuous roll of paper, stored in a paper magazine, by a cutter unit in a desired size, and analog exposure printing is performed thereon has been proposed in Japanese Utility Model publication No. 6-30765 by the present applicant. According to this proposal, a selector means for selectively switching sheets of paper cut in a desired cut size in advance to right and left convey paths is placed midway along a convey path to consecutively convey sheets of paper in right and left rows, thereby increasing the processing speed in each process bath.

Photographic developing/printing apparatuses that enlarge an image on an original film to a desired size, perform analog exposure printing on paper, convey the resultant paper downstream, sequentially convey the paper through process baths containing process solutions for developing, bleaching, and washing, dry the paper, and discharge it outside have become widespread.

With the recent advances in semiconductor techniques, the recording densities of solid-state image sensing elements have greatly increased. So-called digital still cameras and digital video cameras incorporating these solid-state image sensing elements are becoming increasingly popular. These digital still cameras and the like are by no means inferior to conventional silver halide camera in some cases depending on the manner of use. In addition, users can process the image data obtained from such cameras by using personal computers as needed. Owing to these advantages, these cameras are increasingly becoming popular. The following are examples of how digital still cameras and the like are used. The digital data from the cameras are simply displayed on the displays connected to personal computers. The digital image data recorded on the flash memories incorporated in the digital cameras are printed out onto recording paper sheets by using dedicated printers of various schemes.

Many of these dedicated printers are developed on the assumption that they are used as color printers for personal computers. For examples, the following printers are known: a sublimation thermal printer that uses ink ribbons of the three primary colors, and selectively energizes the line thermal heads on the basis of a digital signal obtained from a digital image recorded on the recording means of a digital camera; an ink-jet printer that prints an image by discharging inks of the three primary colors from the ink heads; and an electrophotographic printer using color toners.

A dedicated printer used as a home printer has the following disadvantages:

(a) Since ink ribbons incorporated in cartridges are used, the running cost is high. In addition, since the dedicated printer is expensive, the initial cost is high.

(b) Since inks of three colors (yellow, magenta, cyan, and black) are superimposed to obtain a color photograph, the print color of the ink printed last looks swelled when observed from the upper oblique side. In addition, owing to the limited number of pixels, the limited number of colors, and the like, the obtained photograph is less attractive than the photograph obtained by a general photo lab. For these reasons, digital photography has not become pervasive.

Under the circumstances, if a digital exposure means for performing digital exposure on the basis of a digital signal obtained from digital image data recorded on an image recording means including a digital camera can be mounted in a photographic developing/printing apparatus, all the problems described above can be solved. More specifically, an analog exposure means and a digital exposure means for emitting R, G, and B light beams may be arranged in a line midway along a paper convey path to properly perform exposure.

SUMMARY OF THE INVENTION

If, however, an analog exposure means and a digital exposure means are simply arranged in a row midway along a paper convey path in the above manner, paper may be wasted upon exposure by the analog exposure means and the digital exposure means depending on the configuration of convey paths.

The present invention is therefore made in consideration of the above problem, and has as its first object to provide a photographic developing/printing apparatus which can obtain a silver halide photograph after analog exposure and digital exposure by placing an analog exposure means and a digital exposure means midway along a convey path for paper (printing paper).

It is the second object of the present invention to provide a photographic developing/printing apparatus which can obtain a silver halide photograph after analog exposure and digital exposure and can prevent wasteful paper consumption by placing an analog exposure means and a digital exposure means midway along a convey path for paper (printing paper).

It is the third object of the present invention to provide a photographic developing/printing apparatus which can obtain a silver halide photograph after digital exposure as well as analog exposure by allowing an option unit for performing digital exposure to be added midway along a convey path for paper (printing paper).

In order to solve the above problem and achieve the above objects, according to the present invention, there is provided a photographic developing/printing apparatus including a first paper magazine containing a continuous roll of first printing paper, first cutting means for cutting the first printing paper fed from the first paper magazine in a predetermined size, analog exposure means for conveying the cut first printing paper to an exposure position and performing analog exposure, and a main body portion for performing exposure developing processing by sequentially conveying the first printing paper to a plurality of process baths containing different process solutions after the analog exposure, comprising:

a second paper magazine containing a continuous roll of second printing paper;

digital exposure means for performing digital exposure on the second printing paper fed from the second paper magazine;

switching means for selectively conveying an end portion of the uncut second printing paper to the analog exposure means and the digital exposure means to perform digital exposure on the second printing paper by switching between a first conveyance state in which the end portion of the second printing paper fed from the second paper magazine is conveyed to the analog exposure means and a second conveyance state in which the end portion of the paper is conveyed to the digital exposure means; and second cutting means for cutting the paper in a predetermined size after the digital exposure is performed, wherein after the second printing paper is cut by the second cutting means, the second printing paper is conveyed to the main body portion, and exposure developing processing is performed.

There is preferably provided a photographic developing/printing apparatus including a first paper magazine containing a continuous roll of first printing paper, first cutting means for cutting the first printing paper fed from the first paper magazine in a predetermined size, analog exposure means for conveying the cut first printing paper to an exposure position and performing analog exposure, and a main body portion for performing exposure developing processing by sequentially conveying the first printing paper to a plurality of process baths containing different process solutions after the analog exposure, comprising:

a second paper magazine containing a continuous roll of second printing paper;

switching means for selectively conveying an end portion of the uncut second printing paper to the analog exposure means and the digital exposure means to perform digital exposure on the second printing paper fed from the second paper magazine by switching between a first conveyance state in which the end portion of the second printing paper fed from the second paper magazine is conveyed to the analog exposure means and a second conveyance state in which the end portion of the paper is conveyed to the digital exposure means;

digital exposure/convey means for causing the end portion to pass over a digital exposure unit of the digital exposure means by a convey amount corresponding to a predetermined size in the second conveyance state, and then performing digital exposure while moving the end portion backward;

second cutting means for cutting the paper in a predetermined size after the digital exposure; and an option unit for performing exposure/developing processing by sequentially conveying the second printing paper into the process baths after the paper is cut by the second cutting means, wherein the option unit is juxtaposed with the main body portion.

There is preferably provided a photographic developing/printing apparatus including a first paper magazine containing a continuous roll of first printing paper, first cutting means for cutting the first printing paper fed from the first paper magazine in a predetermined size, analog exposure means for conveying the cut first printing paper to an exposure position and performing analog exposure, and a main body portion for performing exposure developing processing by sequentially conveying the first printing paper to a plurality of process baths containing different process solutions after the analog exposure, comprising:

a second paper magazine containing a continuous roll of second printing paper;

digital exposure means for performing digital exposure on the second printing paper fed from the second paper magazine;

switching means for selectively conveying an end portion of the uncut second printing paper to the analog exposure means and the digital exposure means to perform digital exposure on the second printing paper by switching between a first conveyance state in which the end portion of the second printing paper fed from the second paper magazine is conveyed to the analog exposure means and a second conveyance state in which the end portion of the paper is conveyed to the digital exposure means;

second cutting means for cutting the paper in a predetermined size after the digital exposure; and an option unit for performing exposure/developing processing by sequentially conveying the second printing paper into the process baths after the paper is cut by the second cutting means, wherein the option unit is juxtaposed with the main body portion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a sectional view taken along a line A—A in FIG. 3, showing a front view of a switching mechanism 1;

FIGS. 11A to 11D are views, each showing a detailed example of how paper is conveyed.

DETAILED DESCRIPTION OF THE PREFERRED EMBODIMENT

A preferred embodiment of the present invention will be described below with reference to the accompanying drawings.

Figure 1:
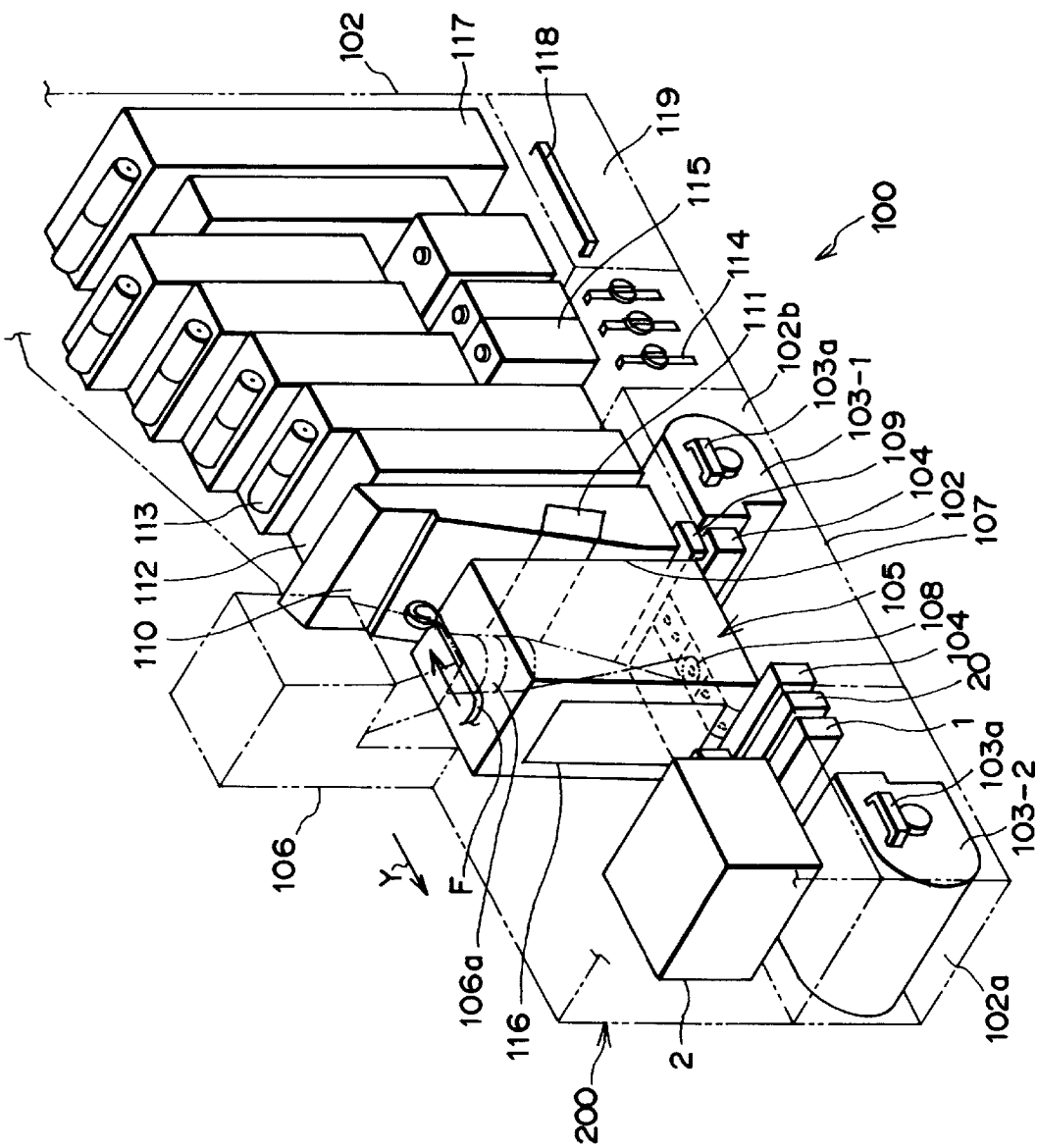
FIG. 1 is a perspective view of the outer appearance of a photographic developing/printing apparatus 100, showing the main part of the overall structure of the apparatus by removing all the covers, some of which are detachably mounted on a housing 102, with an additional unit 200 as an option being added to the apparatus.

FIG. 1 is a perspective view of the outer appearance of a photographic developing/printing apparatus 100. To show the main part of the overall arrangement of the photographic developing/printing apparatus 100, detachable covers and the like are removed from a housing 102 indicated by the chain double-dashed lines in FIG. 1. FIG. 1 also shows the state of the apparatus after an additional unit 200 which is to be set as an option and has a left paper magazine storing unit 102a is added to the apparatus. An illustration of a discharge unit for discharging a finished photograph outside is omitted. Note that the additional unit 200 and the photographic developing/printing apparatus 100 may be integrated into one unit.

As can be seen from FIG. 1, the apparatus 100 is vertically long and narrow in width to minimize the occupied area. In addition, the structure of the apparatus is designed to allow the operator to easily access each main portion of the apparatus from the front surface side. Even if, therefore, the apparatus 100 is installed considerably near a wall in a small store or the like, the operator can easily perform various types of daily operations such as replacement and replenishment of various process solutions. In addition, this structure is designed to minimize the need for accessing the rear surface side of the apparatus 100 in these operations.

The additional unit 200 indicated by the chain double-dashed lines in FIG. 1 and having the left paper magazine storing unit 102a is mounted on the apparatus 100 to be detachable from the side surface side indicated by an arrow Y in FIG. 1. The additional unit 200 can be added to the apparatus, together with a cutter unit 104, so that two, right and left paper magazines 103-1 and 103-2 can be loaded at once, as shown in FIG. 1.

The photographic developing/printing apparatus 100, which has only a right paper magazine storing unit 102b and allows the additional unit 200 having the paper magazine 103-2 to be added later as needed, is installed in a photo lab or photo studio first. The additional unit 200 having the left paper magazine storing unit 102a can be added to the apparatus 100 afterward, as needed, on the basis of the frequency of use after the installation, the amount of paper consumed, including panoramic photographs, and the demand for digital exposure.

Rolls of paper, each having a printing surface coated with a photographic emulsion, are rotatably stored in the paper magazines 103-1 and 103-2 as continuous rolls of paper having predetermined widths (e.g., 89, 102, 127, 152, and 203 mm), while light is completely cut off.

These paper magazines 103-1 and 103-2 are symmetrical, as shown in FIG. 1, to be commonly used in the left paper magazine storing unit 102a and the right paper magazine storing unit 102b. In addition, loading/unloading handles 103a are attached to the two side surfaces on the front and rear sides of each paper magazine. Furthermore, the magazines 103-1 and 103-2 have shutter plates constituting automatic opening/closing mechanisms for opening/closing opening portions when the rolls of paper contained in the magazines are unloaded through the opening portions. Each mechanism automatically opens/closes in the same manner when the corresponding magazine is inserted into the right paper magazine storing unit 102b or the left paper magazine storing unit 102a, and the constituent parts of the magazines are common parts, thereby improving the operability.

The cutter unit 104 placed near the paper magazine 103-1 cuts paper P, which is continuously conveyed, in a desired size before printing is performed thereon in the analog exposure unit. The paper P cut by the cutter unit 104 in a predetermined cut size is conveyed to a printing unit 105 placed in a dark box 107 and is temporarily chucked/fixed on a table 105.

With this operation, preparation for analog exposure printing is complete. A film F is sequentially fed frame by frame to an exposure unit 106 indicated by the chain double-dashed lines in FIG. 1. An optical system 106a constituted by a zoom lens and the like is automatically or manually adjusted to form a latent image in a desired size on the paper P, and analog printing is performed thereon.

After this analog printing, the paper P is conveyed to a sub-convey unit 109 placed above the cutter unit 104, and then is conveyed to a main convey unit 110 above the sub-convey unit 109. A greeting unit 111 for printing greetings and the like on the paper P in the process of conveyance is mounted on the main convey unit 110 to be easily detached. For this reason, the operator must frequently access the main convey unit 110, and the main convey unit 110 is designed to be easily pulled out to the front surface side of the housing 102.

Process baths 112 for sequentially performing developing processing for the paper P after analog exposure printing and digital exposure printing (to be described later) are arranged on the downstream side of the main convey unit 110 in a stepped form such that the vertical positions of the baths become gradually higher toward the downstream side, as shown in FIG. 1. These process baths 112 are arranged such that the convey direction of the paper P is reversed by reverse rolls 113 arranged between the respective paths to convey the paper P to a drying unit 117, and the paper P is finally discharged outside the apparatus 100 after the paper is dried.

Replenishment tanks 115 for replenishing process solutions are placed below the intermediate process baths 112. Used process solutions can be recovered through drains 114 formed below the replenishment tanks 115. When only the front cover (not shown) is opened, all daily operations can be performed.

A power supply unit 119 for supplying necessary power is placed in the housing 102 occupying the space below the drying unit 117. A processor control unit 118 for performing various control operations associated with the respective process baths 112 is placed on the power supply unit 119 to control the overall apparatus while exchanging various control data with a main control unit 116 which is fixed on the left side surface of the dark box 107 and controls paper conveyance.

Figure 2:
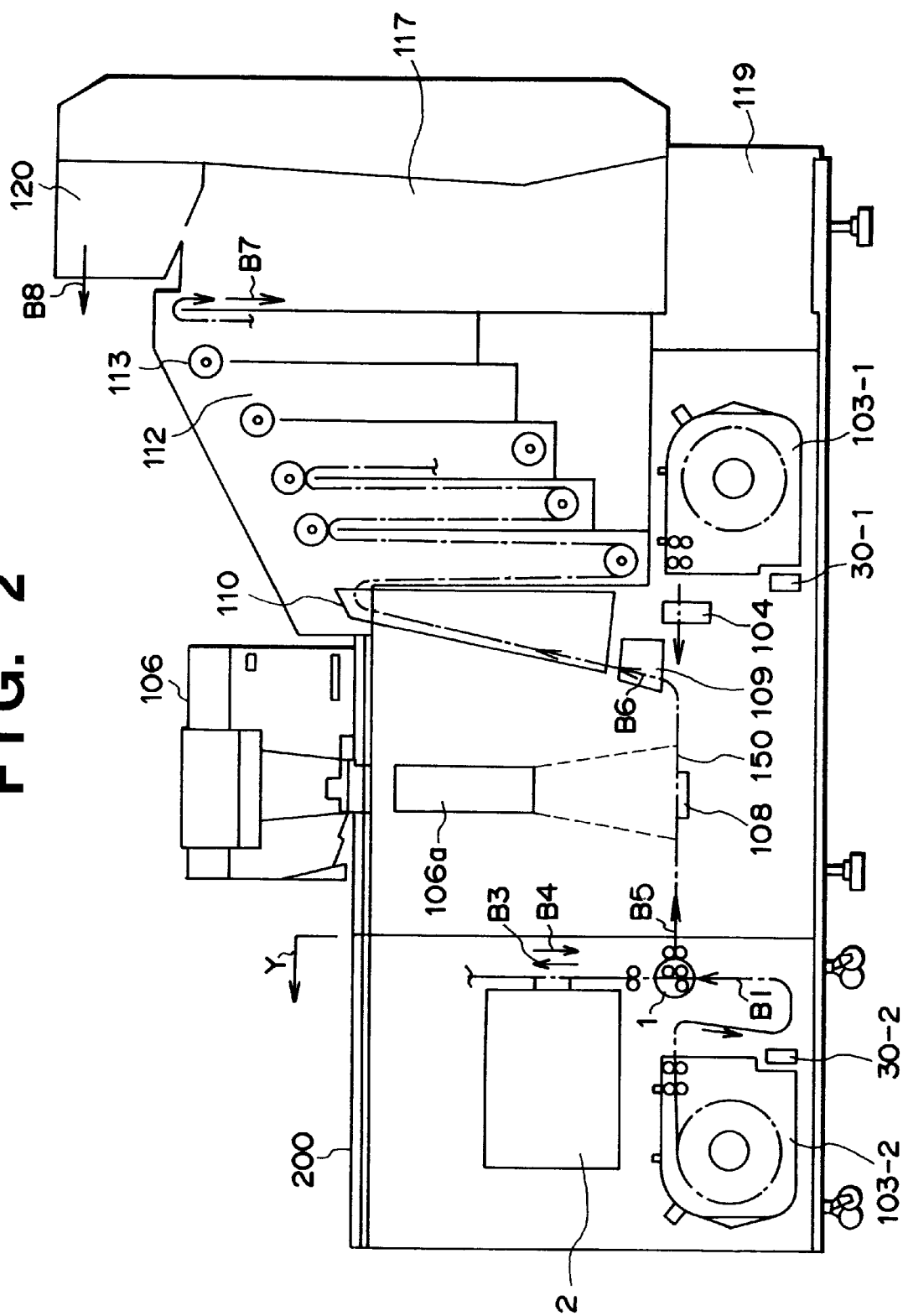
FIG. 2 is a front view showing the schematic structure of the apparatus in FIG. 1.

FIG. 2 is a front view of the structure in FIG. 1, showing how the paper is conveyed. The same reference numerals in FIG. 2 denote the same parts as in FIG. 1, and a description thereof will be omitted.

First of all, the paper in the paper magazine 103-1 is cut by the cutter unit 104. The cut paper is conveyed to a substantially middle position on a printing unit 105 while it is firmly chucked to the table by the suction effect obtained by many holes formed in the table. A chucking unit 108 which can be rotated by a swinging motor is placed below the table 150 to be movable back and forth in the convey direction. The paper P is held at the position in FIG. 1, and analog exposure printing is performed thereon.

More specifically, the chucking unit 108 for holding cut paper at the exposure printing position is mounted on the swinging motor, and a vacuum valve is connected to the chucking unit 108. A vacuum pump is also connected to the chucking unit 108 through a pipe. The chucking unit 108 and the swinging motor are mounted on a carriage. The carriage is reciprocally driven by a timing belt stretched between the output pulley of the motor and a timing pulley. A fan is placed in a hermetic chamber below the table 150 to generate a negative pressure through suction holes formed in the table 150.

After this printing, the paper P is conveyed upward in the direction indicated by an arrow B6 by the main convey unit 110. In the process of conveyance, it is checked whether the paper size is a large size PL. Thereafter, the paper P is conveyed downstream. If the paper size is a small size (127×89 mm), the paper is distributed to the right and left (to the front and the rear on the drawing surface) so as to be conveyed in two rows in the process baths 112. By conveying sheets of paper in two rows in this manner, the process speed can be increased. When oblong sheets of paper such as panoramic photographs (254×89 mm) are to be conveyed, they are also conveyed in two rows.

When printing is to be performed perpendicularly with respect to the convey direction of an original film loaded into the exposure unit 106 as a film scanner in accordance with the exposure size, the swinging motor is driven through 90°, and analog exposure printing is performed, thereby allowing printing on the same type of paper in different sizes.

Sheets of paper P conveyed in the above manner are reversed by the last reverse roll 113 such that the sheets of paper P are conveyed downward in the direction indicated by an arrow B7. As a result, the sheets of paper P are sent to the drying unit 117 to be dried. The sheets of paper P are then discharged in the direction indicated by an arrow B8 and stacked on a discharge unit 120 of the apparatus 100 in order.

In the first conveyance state, the paper fed from the paper magazine 103-2 is conveyed onto the table 150 to be subjected to analog exposure after the paper is cut by the cutter unit 104 (shown in FIG. 1) and conveyed in the direction indicated by an arrow B5. The paper having undergone analog exposure is then conveyed in the direction indicated by the arrow B6 to pass through the respective process baths 112, thereby finishing a photograph.

The second conveyance state is selectively set. In this state, the paper fed from the paper magazine 103-2 is set by the function of a switching mechanism 1 (to be described later) such that the leading end of the paper moves upward along the direction indicated by an arrow B1, as shown in FIG. 2. In this state, the paper is conveyed to the line image exposure unit of a digital image exposure unit 2 for performing digital exposure on the basis of the image data obtained by scanning an original image in the exposure unit (reading unit) 106, and is conveyed downward in the direction indicated by an arrow B4. The paper is then conveyed in the direction indicated by the arrow B5 owing to the reverse function of the switching mechanism 1 to be conveyed onto the table 150. Thereafter, the paper is conveyed in the direction indicated by the arrow B6 to pass through the respective process baths 112, thereby finishing a photograph.

For example, bar codes representing the paper sizes, types, and the like of rolls of paper contained in the paper magazines 103-1 and 103-2 are recorded on the outer surfaces of the magazines. When each magazine is to be loaded, the bar codes are read by magazine detection units 30-1 and 30-2 arranged on the apparatus body side, and the read contents are sent to the main control unit. With this operation, photographs in desired sizes can be obtained, as will be described later.

Figure 3:
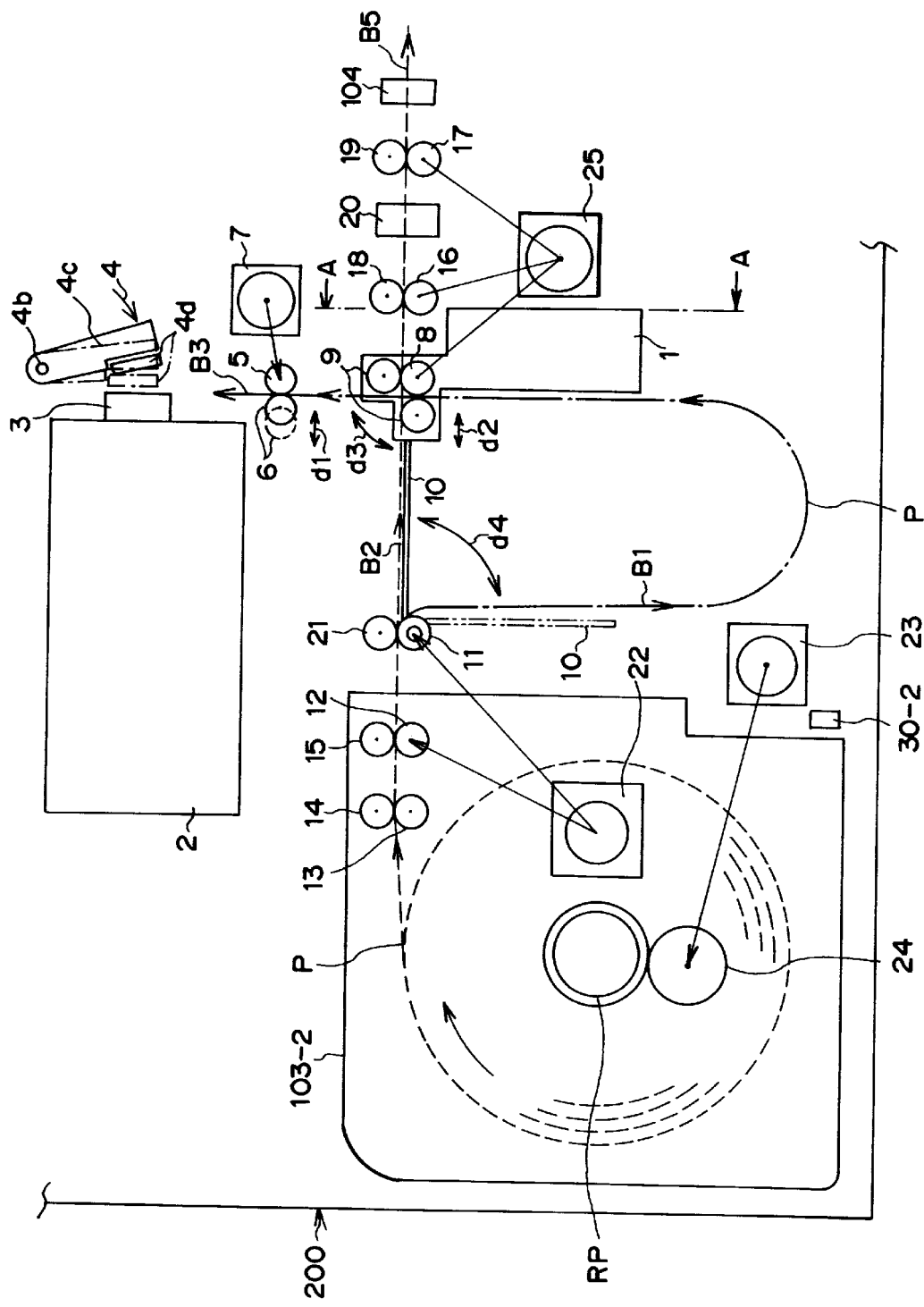
FIG. 3 is a view showing the main part of the additional unit in FIG. 2.

FIG. 3 shows the schematic arrangement of the additional unit 200. The same reference numerals in FIG. 3 denote the same parts as those described above, and a description thereof will be omitted. A motor 23 which is a stepping motor serving as a roll paper drive source is fixed to the housing to drive a drive gear 24 meshing with the gear placed in the core of the roll paper RP contained in the magazine 103-2 so as to drive the roll paper RP. The diameter of the roll paper RP is automatically measured by rotating/driving the motor 23 in the forward and backward directions by amounts corresponding to predetermined numbers of pulses. In addition, as shown in FIG. 3, the paper is intentionally slackened to reduce the load produced in the process of conveying the paper, thereby realizing accurate conveyance.

Idle rollers 14 and 15 are in contact with drive rollers 12 and 13 with clutches to be pivotal such that they rotate together. The respective drive rollers to be described below are pivotally arranged on base portions (not shown) fixed to the housing, while the respective idle rollers are in contact with the drive rollers to be pivotal such that they rotate together. However, only the terms of these rollers will be described below. A stepping motor 22 is coupled to the drive rollers 12 and 13 with the clutches. When the motor 22 is driven in accordance with the number of pulses from a control circuit, each drive roller is driven.

An idle roller 21 is in contact with a drive roller 11 which is driven to convey the paper fed from the paper magazine 103-2, thus producing a convey force. On the other hand, a movable guide plate 10 adapted to be driven in the direction indicated by an arrow d4 and be stopped at the positions indicated by the solid and dotted lines in FIG. 3 is placed around the rotating shaft of the drive roller 11. The movable guide plate 10 guides the paper in the direction indicated by an arrow B2 in the first conveyance state, and sets the second conveyance state at the position indicated by the dotted line in FIG. 3.

The switching mechanism 1 for switching between a state in which the leading end of paper is conveyed in the direction indicated by the arrow B5 and a state in which the leading end of paper is conveyed in the direction indicated by an arrow B3 is placed on the downstream side near the movable guide plate 10. For this purpose, the switching mechanism 1 includes a drive roller 8 which is rotated/driven clockwise upon reception of a driving force from a motor 25, and a nip roller 9 which freely pivots around the drive roller 8 in the direction indicated by an arrow d3, and is driven in the direction indicated by an arrow d2 in FIG. 3 to be maintained in a contact state and a separated state with respect to the drive roller 8.

A drive roller 5 driven by a stepping motor 7 and an idle roller 6 are arranged along the paper convey path which is constituted by the rollers 8 and 9 of the switching mechanism 1 and is determined by the rigidity of paper itself. The idle roller 6 comes into contact with the drive roller 5 to follow its rotation, as indicated by the solid line in FIG. 3. In addition, the idle roller 6 is driven to the position indicated by the dotted line in FIG. 3 by a solenoid mechanism (not shown) to be moved in the direction indicated by an arrow d1, as needed, so as to be set in a state in which a paper convey force is generated and a state in which the force is canceled.

A line image exposure unit 3 is placed along the paper convey path formed by the rollers 5 and 6. The line image exposure unit 3 includes a platen mechanism 4 in which a main body 4c, pivotally supported on a shaft member 4b, acquires a contact force from a component of force based on its own weight. The platen mechanism 4 also includes a pad portion 4d having a spring (not shown). The platen mechanism 4 presses the photographic emulsion surface of paper against the light-emitting portion of the line image exposure unit 3 with a predetermined pressure.

Drive rollers 16 and 17 for obtaining a driving force from the motor 25 are arranged on the downstream side of the switching mechanism 1, together with idle rollers 18 and 19.

The cutter unit 20 is placed between these rollers, and the cutter unit 104 is placed on the downstream side of the cutter unit 20. These cutter units are arranged to cut overlapping exposed portions (to be described later). In the cutter units 20 and 104, the rotating blades are driven by rotating cutter driving motors to cut paper. The position of each rotating blade is detected by a dog sensor to increase the process speed.

FIG. 4 is a sectional view taken along a line A—A in FIG. 3, showing the detailed structure of the switching mechanism 1 detached from the apparatus body.

Referring to FIG. 4, a base portion 40 of the switching mechanism 1 is formed by performing sheet metal pressing and spot welding with respect to metal plates (SPCC) having a predetermined thickness. As shown in FIG. 4, the base portion 40 has a shape having a predetermined strength, and sub-base portions 41 constituted by different parts are fixed to the two side surfaces of the base portion 40.

Axial bearings 42 for pivotally and axially supporting two shaft end portions 8b of the drive roller 8 are fixed to these sub-base portions 41. A pivot base portion 43 swingably supporting a nip roller base portion 44 pivotally and axially supporting shaft end portions 9b of the nip roller 9 are axially supported on the axial bearings 42 in a coaxial state to be pivotal about the axis of the drive roller 8.

A geared motor 46 having a drive gear 47 fixed to its output shaft is fixed to the base portion 40. The drive gear 47 meshes with a driven gear 48 fixed to the pivot base portion 43. With this structure, as the geared motor 46 is driven in a predetermined direction, the right and left rotating base portions 43 pivot through about 90° to drive the nip roller 9 around the outer surface of the drive roller 8.

A coupling 57 for obtaining a driving force from a large-sized motor (not shown) is fixed to the right shaft end portion 8b of the drive roller 8. When the switching mechanism 1 is inserted/mounted in the direction indicated by the double arrow in FIG. 4, the coupling 57 meshes with a coupling (not shown) on the other side. A sensor 39 is used to detect the end of pivoting motion of the pivot base portion 43 when the pivot base portion 43 pivots through 90°, and the optical axis is blocked by an actuator mounted on the pivot base portion 43. As a result, the motor is stopped.

Figure 5A:
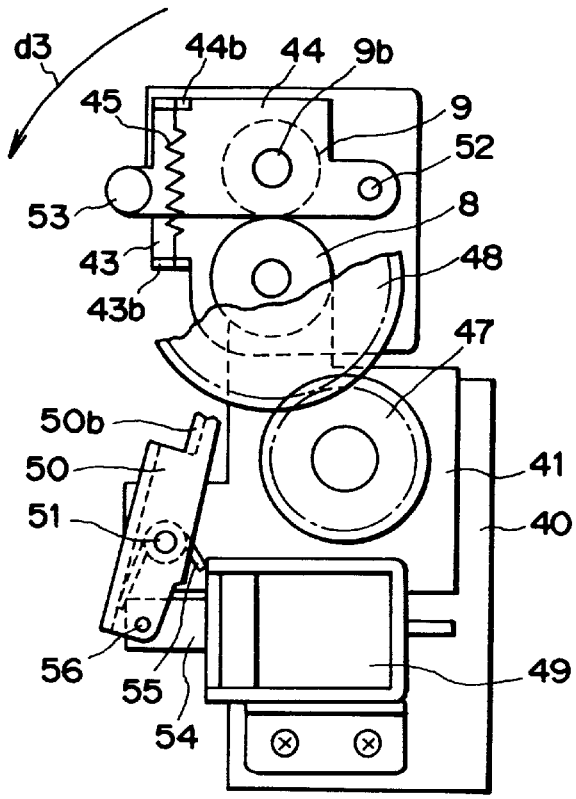
FIGS. 5A and 5B are side views of the structure in FIG. 4.

Referring to FIG. 4 and FIG. 5A which is a left side view of the structure in FIG. 4, the nip roller base portion 44 is swingable around pins 52 standing upward from the pivot base portions 43, and the nip roller 9 is always kept in contact with the drive roller 8 owing to the effect of tension springs 45 stretched between hook portions 44b of the nip roller base portion 44 and hook portions 43b of the pivot base portions 43.

Pins 56 are placed on plungers 54 of latch type solenoids 49 fixed to the two side surfaces of the base portion 40. Each pin 56 is inserted into the hole portion of an arm member 50 which is pivotally held on a pin 51 standing upward from the sub-base portion 41 and is biased to move to the position shown in FIG. 5A owing to the effect of a torsion spring 55.

Figure 5B:
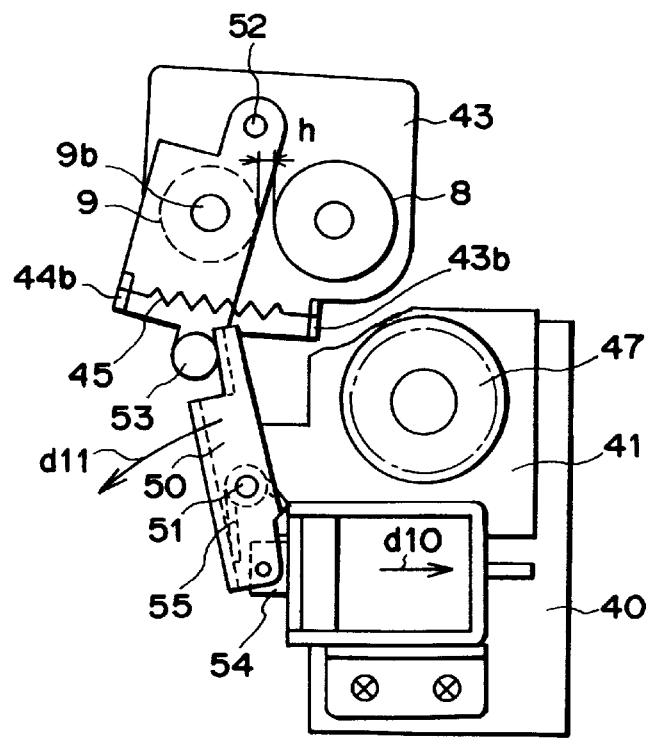

In this structure, when the geared motor 46 is energized to cause the pivot base portion 43 to pivot through about 90° in the direction indicated by an arrow d3, and the state shown in FIG. 5B is set, the solenoid 49 is energized to attract the plunger 54 in the direction indicated by an arrow d10, as shown in FIG. 5B, and this state is held by the magnet incorporated in the latch type solenoid 49.

With this operation, the arm member 50 is moved against the biasing force of the torsion spring 55 in the direction indicated by an arrow d11. As a result, an action end 50b comes into contact with a pin 53 standing upward from the nip roller base portion 44, and the nip roller 9 is separated from the drive roller 8 by a distance h. In addition, with a reverse process to the above process, the state shown in FIG. 5A is restored, as needed.

Figure 6A:
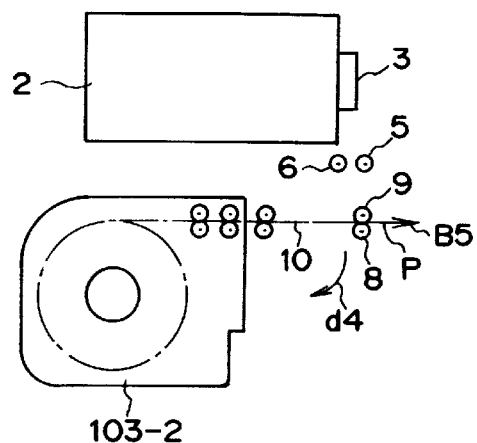
FIGS. 6A to 6F are views for explaining the operation of the switching mechanism 1.

FIGS. 6A to 6F explain the operation of the switching mechanism 1, and schematically show the digital image exposure unit 2, the paper magazine 103-2, the respective rollers, and the like. Referring to FIG. 6A, the pivot guide plate 10 is kept still at the "up" position, and the nip roller 9 of the switching mechanism 1 is kept in contact with the drive roller 8. The idle roller 6 is kept apart from the drive roller 5. In this state, the leading end of the paper P is fed outside the magazine and guided onto the pivot guide plate 10. The paper P is held between the nip roller 9 of the switching mechanism 1 and the drive roller 8 and conveyed in the direction indicated by an arrow B5 owing to the convey force generated between the rollers, and the first conveyance state is maintained. With the above series of operations, general analog exposure printing is performed by using the roll paper having a predetermined width and contained in the paper magazine 103-2.

When digital exposure printing is to be performed, first of all, the pivot guide plate 10 in the state shown in FIG. 6A is caused to pivot through about 90° in the direction indicated by an arrow d4. Before or after this operation, the geared motor 46 of the switching mechanism 1 is started to rotate the nip roller 9 about the drive roller 8 through about 90° in the counterclockwise direction (the direction indicated by an arrow d3). As a result, the leading end of the paper faces upward. Subsequently, the paper is fed from the paper magazine 103-2, and the state shown in FIG. 6B is set. As indicated by the dotted line in FIG. 6B, a downward slack on the paper is ensured.

Figure 6D:
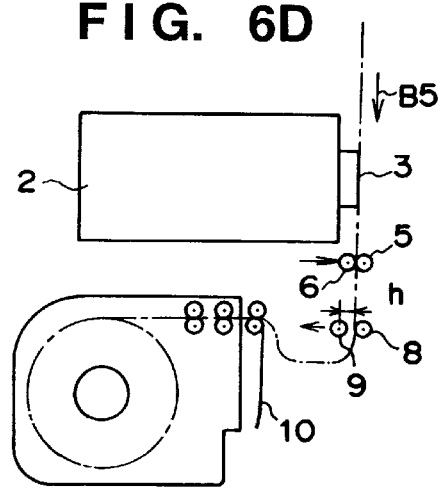
Figure 6B:
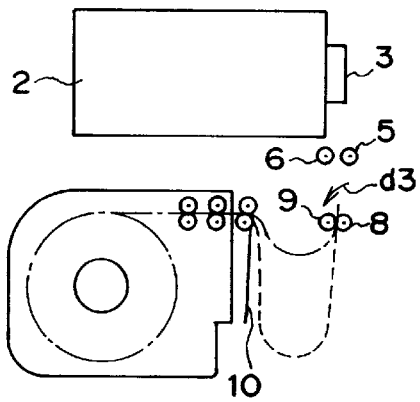
Figure 6E:
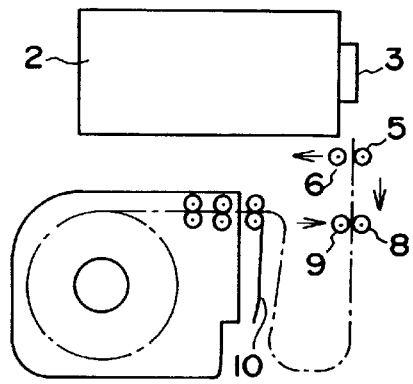
Figure 6C:
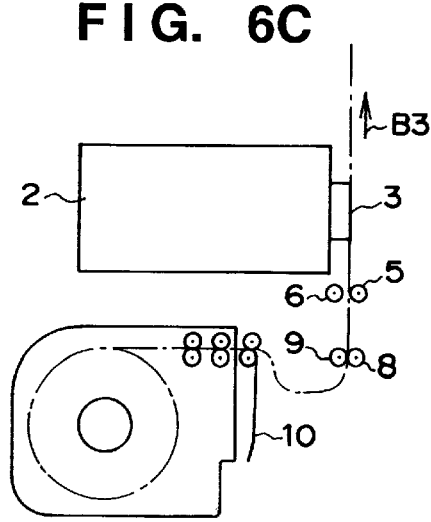

Subsequently, as shown in FIG. 6C, the leading end of the paper is conveyed in the direction indicated by an arrow B3 by a distance corresponding to a predetermined size owing to the convey force generated by the drive roller 8 and the nip roller 9 and the rigidity of the paper, thereby completing the preparation for digital exposure.

After this operation, as shown in FIG. 6D, the nip roller 9 of the switching mechanism 1 is separated from the drive roller 8 by the distance h, and the idle roller 6 is kept in contact with the drive roller 5. Thereafter, color signals for R, G, and B are sent to the digital image exposure unit 2, and the paper is scanned in the main scanning direction in the line image exposure unit 3 to expose a one-line image, while the paper is scanned in the sub-scanning direction (conveyed in the direction indicated by an arrow B4) in synchronism with the convey amount based on the drive roller 5 and the idle roller 6, thereby forming a latent image on the photographic emulsion surface of the paper.

When the latent image is formed in this manner, the idle roller 6 is kept apart from the drive roller 5, as shown in FIG. 6E. At the same time, the nip roller 9 of the switching mechanism 1 comes into contact with the drive roller 8 to drive the drive roller 8 counterclockwise, thereby maintaining the paper in a state in which it is slackened downward.

Figure 6F:
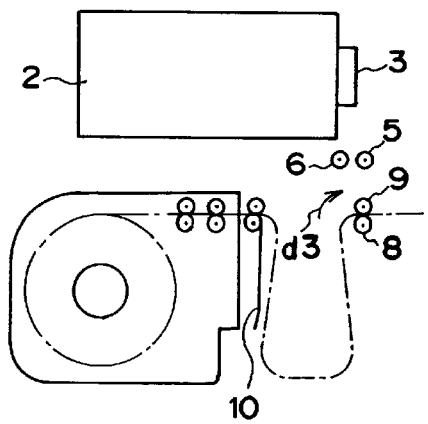

After this operation, as shown in FIG. 6F, the nip roller 9 of the switching mechanism 1 is driven in the clockwise direction (the direction indicated by an arrow d3). With the above operation, a series of operations for digital exposure printing is complete, and the leading end of the paper is conveyed downstream upon clockwise rotation of the drive roller 8.

Figure 7A:
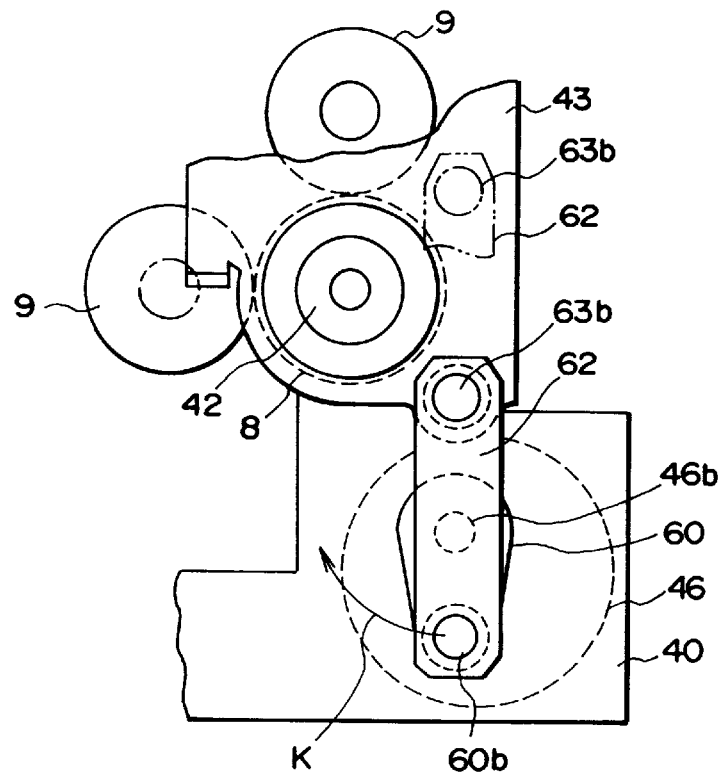
FIGS. 7A and 7B are side views for explaining the operation of the switching mechanism 1 with another structure.
Figure 7B:
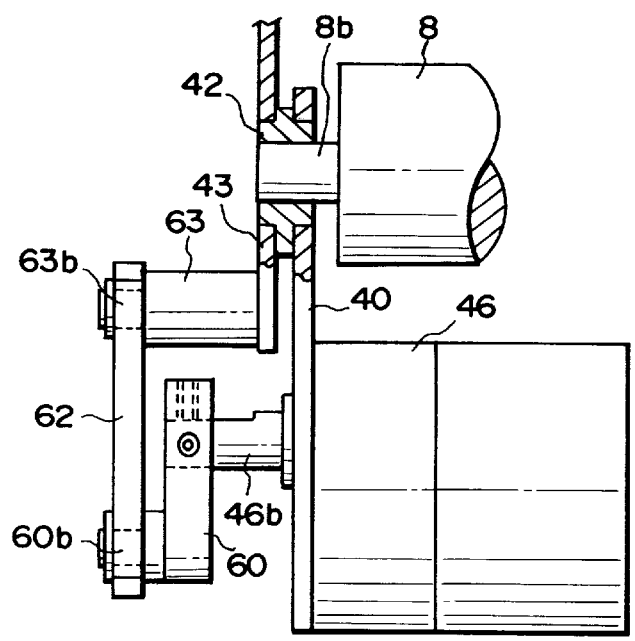

FIG. 7A is an enlarged side view of part of a modification of the structure of the switching mechanism. FIG. 7B is a sectional view of the main part of the switching mechanism. The same reference numerals in FIGS. 7A and 7B denote the same parts as those described above, and a description thereof will be omitted.

Referring to FIGS. 7A and 7B, a crank member 60 having a pin 60b on its one end is fixed to an output shaft 46b of the geared motor 46. A stud 63 having a pin 63b integrally formed thereon stands upward from the pivot base portion 43. A connecting rod 62 is placed between the pins 63b and 60b, as shown in FIG. 7A.

In the above structure, as the geared motor 46 is started, the crank member 60 is rotated in the direction indicated by an arrow K to move the connecting rod 62 to the position indicated by the chain line in FIG. 7A, and the pivot base portion 43 pivots. As a result, the nip roller 9 moves to the position indicated by the dotted line in FIG. 7A. When the switching mechanism 1 is such a crank mechanism, the number of parts can be further decreased to realize an inexpensive structure. In addition, the rotating direction of the geared motor 46 need not be switched between the forward and backward directions, but can be set to one direction, unlike the switching mechanism 1 described above. For this reason, the drive control circuit for this motor can be simplified.

Figure 8:
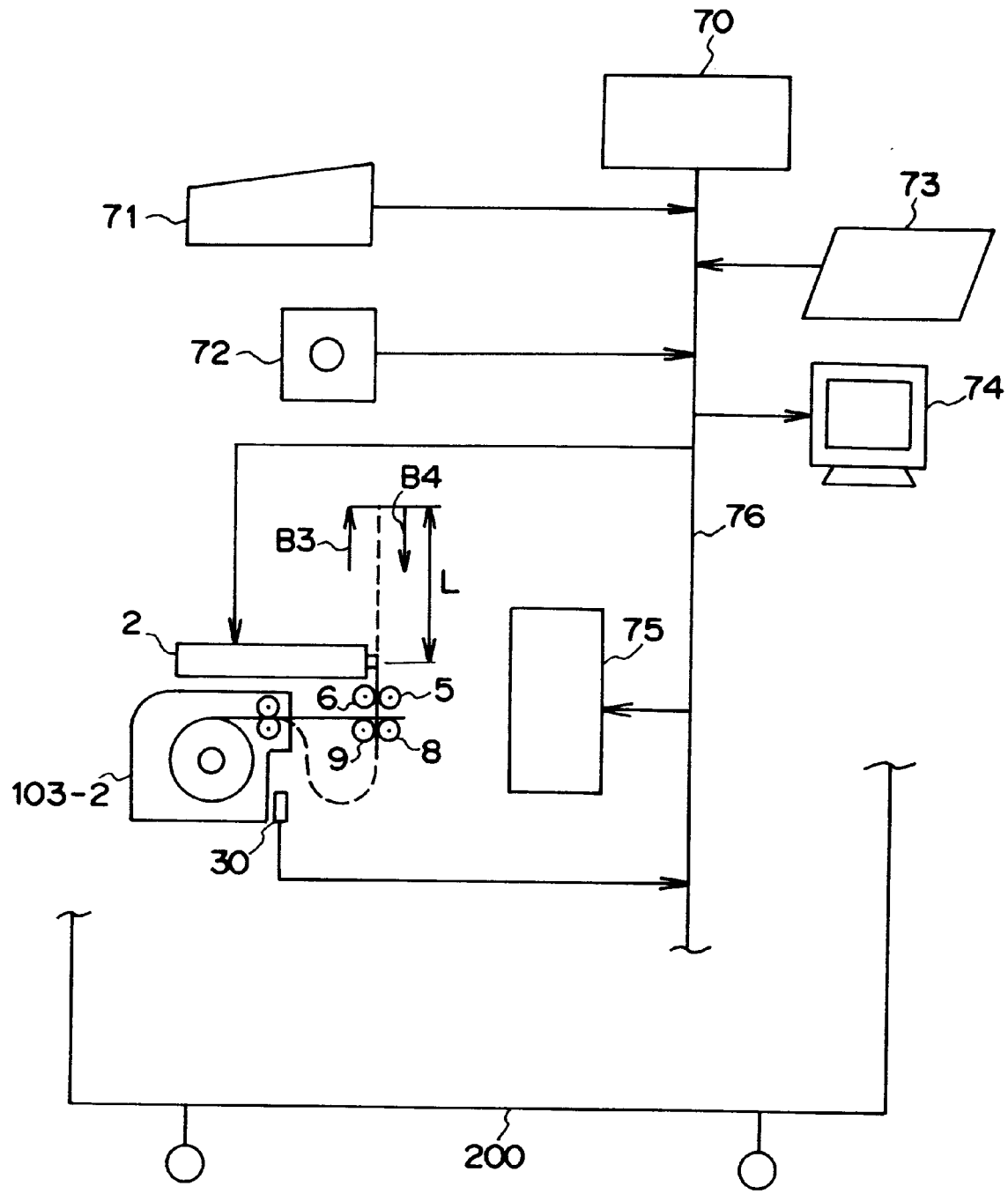
FIG. 8 is a block diagram showing a digital exposure unit.

FIG. 8 is a block diagram of the additional unit 200 described above. The same reference numerals in FIG. 8 denote the same parts as those described above, and only the portions which have not been described will be described below. A bus line 76 connected to the main control unit 116 is connected to the additional unit 200. In the additional unit 200, a main control unit 70 controls digital exposure by distributed processing.

For this purpose, the following units are connected to the bus line 76: an operating unit 71 which is operated by the operator to designate an image range for a digitizer or the like; an image input unit 72 for inputting image data from a digital camera and the like; a data storage unit 73 storing the relationship between a desired size and a paper feed amount L with respect to the digital exposure unit; a display unit 74 for displaying a read image; a driver unit 75 for performing the above motor driving control; a magazine sensor unit 30; and the digital image exposure unit 2. With this arrangement, driving control of the respective rollers 8, 9, 5, and 6 is performed, as shown in FIGS. 6A to 6F. An example of control processing in the above arrangement will be described below with reference to the flow chart of FIG. 9.

Figure 9:
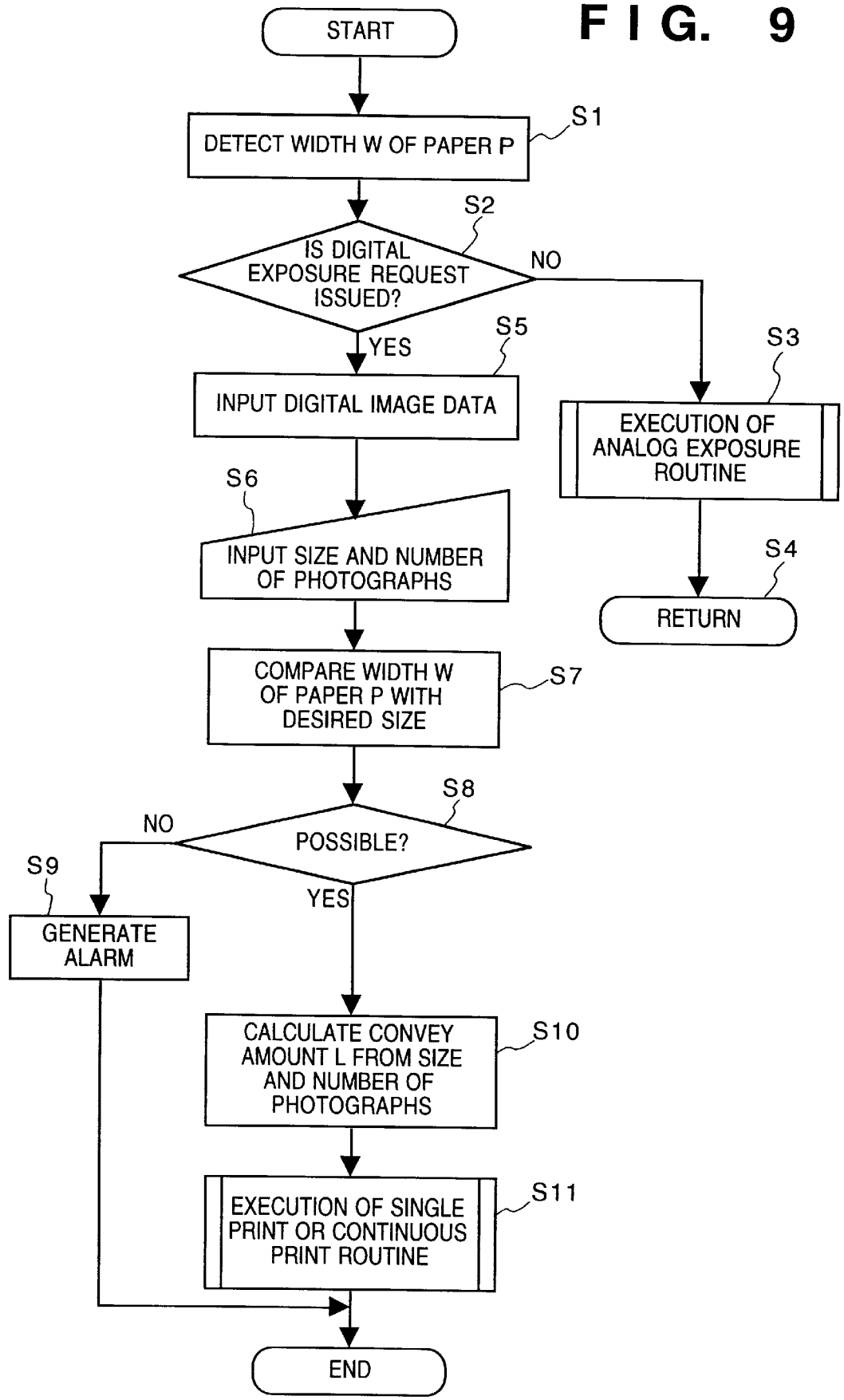
FIG. 9 is a flow chart for digital exposure.

Referring to FIG. 9, when the apparatus is started and ready to operate, a width W of the paper P contained in the magazine is detected by the magazine sensor unit 30, and the detection result is temporarily stored in the main control unit 70 in step S1.

In step S2, it is checked whether a digital exposure request is issued from the operating unit 71. If NO in step S2, the flow advances to step S3 to execute a routine for general analog exposure printing. This processing is executed until the next instruction is received. The flow returns in step S4.

If it is determined in step S2 that a digital exposure printing instruction is input, the flow advances to step S5 to input digital image data so as to input a desired size and a desired number of photographs from the operating unit 71. Thereafter, the flow advances to step S7 to compare the temporarily stored width W of the paper P with the desired paper size. The flow then advances to step S8. If they coincide with each other, since digital exposure can be performed, the flow advances to step S10. If it is determined in step S8 that the width W and the desired size do not coincide with each other, an alarm or the like is generated in step S9 to urge the operator to replace the magazine. Alternatively, information for requesting the operator to change the size is displayed on the display unit 74. Thereafter, the processing is terminated.

In step S10, a convey amount L is calculated from the desired size and the desired number of photographs obtained from the data storage unit 73. In step S11, a single print routine or a continuous, multiple print routine is executed in the manner described with reference to FIGS. 6A to 6F. Thereafter, digital exposure printing is complete.

FIGS. 10A to 10D are flow charts for explaining the control processing in step S10 in FIG. 9 in detail. The control processing will be described below with reference to FIGS. 6A to 6F and FIGS. 10A to 10D. First of all, referring to FIG. 10A, when information indicating a size of 152×102 is input from the operating unit 71, and it is determined in step S1 in FIG. 9 that roll paper P having a width W of 152 mm is contained in the paper magazine 103-2, the paper is conveyed by 103.5 mm, which is the sum of the length (102 mm) of a short side of the finished photograph and an overlap M (1.5 mm) (to be described later), according to the series of convey operations shown in FIGS. 6A to 6C.

Figure 10A:
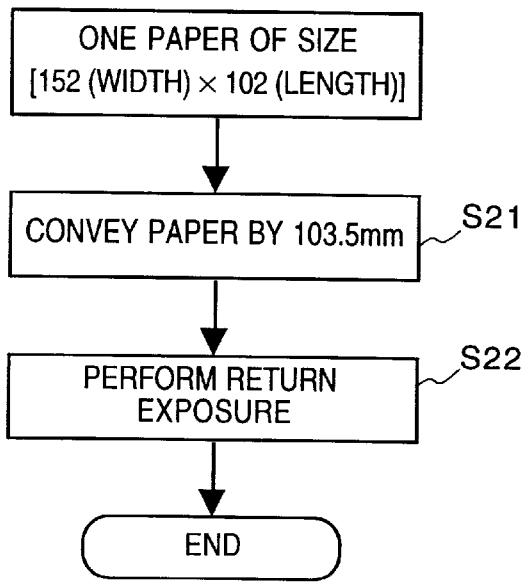
FIGS. 10A to 10D are flow charts, each showing processing in step S10 in FIG. 9.

Subsequently, the flow advances to step S22 in FIG. 10A to scan the paper in the main scanning direction in the line image exposure unit 3 in synchronism with the convey operation using the rollers 5 and 6 so as to perform "return exposure" in the direction indicated by the arrow B4 in FIG. 6D. The exposure is then terminated, and the state shown in FIG. 6E is set. Thereafter, the paper is conveyed in the manner shown in FIG. 6F, and the overlap M is cut by the cutter unit 20 to set the paper to the predetermined length. The paper is then conveyed downstream to obtain a finished photograph.

Figure 10B:
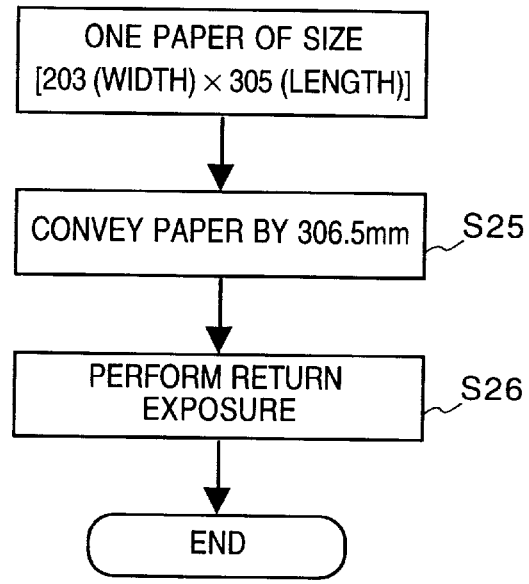

Referring to FIG. 10B, when information indicating a size of 203×305, i.e., "eight by ten", which is a large size is input from the operating unit 71, and it is determined in step S1 in FIG. 9 that roll paper P having a width W of 203 mm is contained in the paper magazine 103-2, the paper is conveyed by 306.5 mm, which is the sum of the length (305 mm) of a short side of the finished photograph and an overlap M (1.5 mm), according to the series of convey operations shown in FIGS. 6A to 6C. Subsequently, the flow advances to step S22 in FIG. 10A to scan the paper in the main scanning direction in the line image exposure unit 3 in synchronism with the convey operation using the rollers 5 and 6 so as to perform "return exposure" in the direction indicated by the arrow B4 in FIG. 6D. The exposure is then terminated, and the state shown in FIG. 6E is set. Thereafter, the paper is conveyed in the manner shown in FIG. 6F, and the overlap M is cut by the cutter unit 20 to set the paper to the predetermined length. The paper is then conveyed downstream to obtain a finished photograph.

Figure 10C:
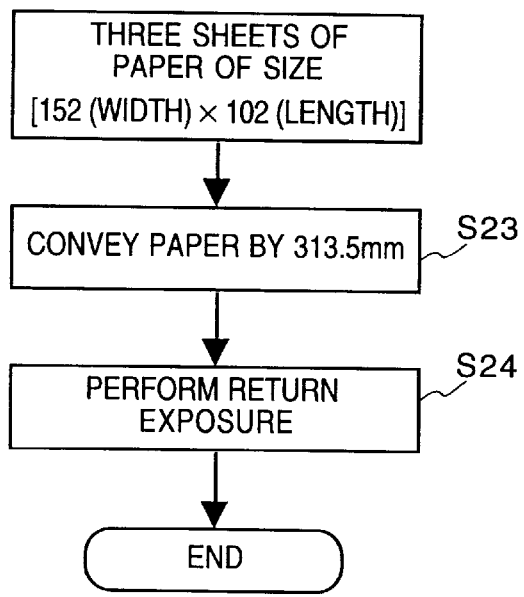
Figure 10D:
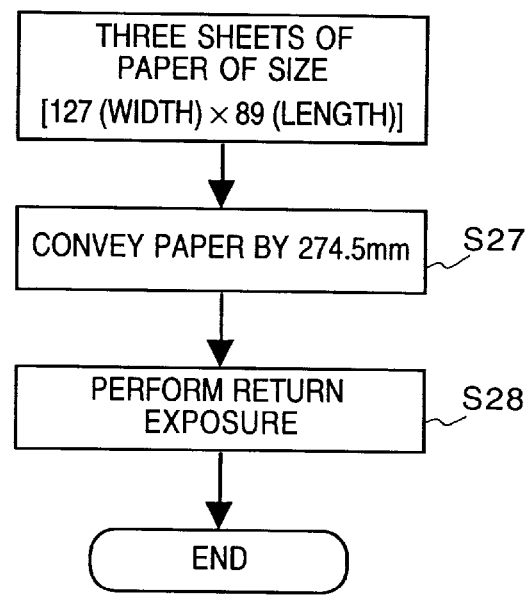

Referring to FIG. 10C, when information indicating a size three times a post card size of 152×102 which is a desired size is input from the operating unit 71, and it is determined in step S1 in FIG. 9 that roll paper P having a width W of 152 mm is contained in the paper magazine 103-2, the paper is conveyed by 313.5 mm, which is the sum of the length (306 mm) of a short side of the finished photograph and five overlaps M (7.5 mm), according to the series of convey operations shown in FIGS. 6A to 6C. Then, the flow advances to step S22 in FIG. 10A to scan the paper in the main scanning direction in the line image exposure unit 3 in synchronism with the convey operation using the rollers 5 and 6 so as to perform "return exposure" in the direction indicated by the arrow B4 in FIG. 6D. The exposure is then terminated, and the state shown in FIG. 6E is set. Thereafter, the paper is conveyed in the manner shown in FIG. 6F, and the overlaps M are cut by the cutter unit 20 to set the paper to the predetermined length. The paper is then conveyed downstream to obtain finished photographs.

Referring to FIG. 4D, when information indicating a size three times an L size of 127×89 which is a desired size is input from the operating unit 71, and it is determined in step S1 in FIG. 9 that roll paper P having a width W of 127 mm is contained in the paper magazine 103-2, the paper is conveyed by 274.5 mm, which is the sum of the length (89×3=267 mm) of a short side of the finished photograph and five overlaps M (7.5 mm), according to the series of convey operations shown in FIGS. 6A to 6C. Finally, the paper is processed in the same manner as described above to obtain finished photographs.

FIGS. 11A to 11D schematically show the states of the line image exposure unit 3 in FIGS. 6A to 6D, when viewed from the front surface side.

FIG. 11A shows how digital exposure is performed on one "eight by ten" photograph described in the flow chart of FIG. 10B. Referring to FIG. 11A, after a paper end portion Pt is conveyed from the line image exposure unit 3 (indicated by the chain line in FIG. 11A) by 306.5 mm in the direction indicated by an arrow B3, digital exposure is performed while the paper is conveyed in the direction indicated by an arrow B4. To do this, the line image exposure unit 3 whose exposure width is larger than 203 mm by 3 mm is used to perform digital exposure of an image G larger in length than all the four sides of the paper by 1.5 mm.

When digital exposure of the image G larger in length than all the four sides of the paper P by 1.5 mm is performed, no unexposed portion which has not undergone digital exposure is formed on the paper P.

FIG. 11C shows how digital exposure is performed on paper corresponding to three photographs of the size described in the flow chart of FIG. 10C. Referring to FIG. 11C, after a paper end portion Pt is conveyed from the line image exposure unit 3 (indicated by the chain line in FIG. 11A) by 313.5 mm in the direction indicated by an arrow B3, digital exposure is performed while the paper is conveyed in the direction indicated by an arrow B4. To this end, digital exposure of the image G larger in length than all the four sides of the paper P by 1.5 mm is performed so as not to form any unexposed portion which has not undergone digital exposure on the paper P. The two adjacent overlaps M are then cut. Similarly, as shown in FIGS. 11B and 11D, single or continuous print processing is performed. The common condition for such exposure processing is that paper should be conveyed in units of 320 mm or less.

When return exposure was properly performed within this convey length limit, the following effects were confirmed. In the case shown in FIG. 11D, the time required for exposure could be shortened 25% as compared with the case in which exposure was performed in units of sheets of paper. In the case shown in FIG. 11C in which exposure was performed for three photographs together, the time required for exposure could be shortened 50% as compared with the case in which exposure is performed in units of sheets of paper. In the case shown in FIG. 11D, the time required for exposure could be shortened 55%.

In adding, return exposure allows paper to be conveyed by only an amount required for exposure in this manner. For this reason, efficient conveyance of paper can be performed as compared with the case described with reference to, for example, FIG. 6C, in which digital exposure is performed while main scanning is performed, and the paper is conveyed in the direction indicated by the arrow B3 for a sub-scanning operation.

In the above description, the digital exposure unit is mounted on the additional unit 200. As a matter of course, however, the present invention is not limited this, and various arrangements can be employed. The additional unit 200 may be integrally formed. Since digital image data can be sent through communication lines and the like, new services can be provided. For example, desired digital image data is transmitted from a remote place to a photo lab, and finished photographs are sent to the user by mail or the like. That is, the range of applications of the present invention is broad.

As has been described, according to the present invention, there is provided a photographic developing/printing apparatus which can minimize wasteful paper consumption when an analog exposure means and a digital exposure means are arranged midway along a convey path for printing paper.

The present invention is not limited to the above embodiments and various changes and modifications can be made within the spirit and scope of the present invention. Therefore, to apprise the public of the scope of the present invention the following claims are made.

What is claimed is:

1. A photographic developing/printing apparatus including a first paper magazine containing a continuous roll of first printing paper, first cutting means for cutting the first printing paper fed from said first paper magazine, analog exposure means for conveying the cut first printing paper to an exposure position and performing analog exposure, and a main body portion for performing exposure developing processing by sequentially conveying the first printing paper to a plurality of process baths containing different process solutions after the analog exposure, comprising:

a second paper magazine containing a continuous roll of uncut second printing paper;

digital exposure means for performing digital exposure on the uncut second printing paper fed from said second paper magazine;

switching means for selectively conveying an end portion of the uncut second printing paper to said analog exposure means and said digital exposure means to perform digital exposure on the uncut second printing paper by switching between a first conveyance state in which the end portion of the uncut second printing paper fed from said second paper magazine is conveyed to said analog exposure means and a second conveyance state in which the end portion of the uncut second printing paper is conveyed to said digital exposure means; and second cutting means for cutting the uncut second printing paper after the digital exposure is performed, wherein after the uncut second printing paper is cut by said second cutting means, a piece of the cut second printing paper is conveyed to said main body portion, and exposure developing processing is performed.

2. The apparatus according to claim 1, further comprising multiple row convey means for sequentially conveying the uncut first or second printing paper in two rows, with a predetermined distance being ensured therebetween, thereby improving a processing ability in said process baths.

3. The apparatus according to claim 1, wherein housings of said first and second paper magazines are formed to be symmetrical to allow single type of housings to be commonly used for said first and second paper magazines.

4. The apparatus according to claim 1, wherein said first and second paper magazines can be unloaded from a front side of said main body portion.

5. The apparatus according to claim 1, further comprising detection means, placed in said main body portion, for detecting mounted states of said first and second paper magazines and types of printing paper contained therein.

6. The apparatus according to claim 1, wherein continuous rolls of printing paper having different widths are used as the uncut first printing paper and the uncut second printing paper.

7. The apparatus according to claims 1, further comprising printing paper rotating means, placed at the analog exposure position, for rotating the cut first printing paper, cut in landscape orientation by said first cutting means, through 90° at the analog exposure position, and restoring the cut first printing paper to a previous posture after the analog exposure, thereby allowing exposure in portrait orientation.

8. The apparatus according to claim 1, further comprising drying/discharging means, placed on a downstream side of said process baths, for drying the cut first printing paper and the cut second printing paper and for discharging the first and second cut printing paper.

9. A photographic developing/printing apparatus including a first paper magazine containing a continuous roll of uncut first printing paper, first cutting means for cutting the uncut first printing paper fed from said first paper magazine to create cut first printing paper, analog exposure means for conveying the cut first printing paper to an exposure position and performing analog exposure, and a main body portion for performing exposure developing processing by sequentially conveying the cut first printing paper to a plurality of process baths containing different process solutions after the analog exposure, comprising:

a second paper magazine containing a continuous roll of uncut second printing paper;

digital exposure means for performing digital exposure on the uncut second printing paper fed from said second paper magazine;

switching means for selectively conveying an end portion of the uncut second printing paper to said analog exposure means and said digital exposure means to perform digital exposure on the uncut second printing paper fed from said second paper magazine by switching between a first conveyance state in which the end portion of the uncut second printing paper fed from said second paper magazine is conveyed to said analog exposure means and a second conveyance state in which the end portion of the uncut second paper is conveyed to said digital exposure means;

digital exposure/convey means for causing the end portion to pass over a digital exposure unit of said digital exposure means by a convey distance in the second conveyance state, and then performing digital exposure while moving the end portion backward; and an option unit which includes second cutting means for cutting the uncut second printing paper to create cut second printing paper after the digital exposure and performs exposure/developing processing by sequentially conveying the cut second printing paper into said process baths after the uncut second paper is cut by said second cutting means, wherein said option unit is juxtaposed with said main body portion.

10. The apparatus according to claim 9, wherein said first paper magazine and said first cutting means are arranged below said process baths, said first paper magazine and said second cutting means are arranged at a substantially symmetrical position with respect to said first paper magazine through said analog exposure means, and said digital exposure means is placed above said second paper magazine.

11. The apparatus according to claim 9, wherein the conveying distance for the digital exposure corresponds to not more than a maximum size of a predetermined size, and is set such that an integer multiple of the predetermined size is not more than the maximum size.

12. The apparatus according to claim 9, wherein the digital exposure is sequentially performed such that marginal portions are provided for four sides of the cut printing paper of the predetermined size, and overlapping marginal portions are cut.

13. The apparatus according to claim 12, further comprising third cutting means for cutting the overlapping marginal portions.

14. A photographic developing/printing apparatus including a first paper magazine containing a continuous roll of first printing paper, first cutting means for cutting the first printing paper fed from said first paper magazine, analog exposure means for conveying the cut first printing paper to an exposure position and performing analog exposure, and a main body portion for performing exposure developing processing by sequentially conveying the first printing paper to a plurality of process baths containing different process solutions after the analog exposure, comprising:

a second paper magazine containing a continuous roll of uncut second printing paper;

digital exposure means for performing digital exposure on the uncut second printing paper fed from said second paper magazine;

switching means for selectively conveying an end portion of the uncut second printing paper to said analog exposure means and said digital exposure means to perform digital exposure on the second printing paper by switching between a first conveyance state in which the end portion of the uncut second printing paper fed from said second paper magazine is conveyed to said analog exposure means and a second conveyance state in which the end portion of the uncut second paper is conveyed to said digital exposure means; and an option unit which includes second cutting means for cutting the uncut second printing paper to create cut second printing after the digital exposure and performs exposure/developing processing by sequentially conveying the cut second printing paper into said process baths after the uncut second printing paper is cut by said second cutting means, wherein said option unit is juxtaposed with said main body portion.

15. The apparatus according to claim 14, wherein said option unit is integrally provided in said main body portion.

* * * * *